US010301043B2

(12) United States Patent
Shoer et al.

(10) Patent No.: US 10,301,043 B2
(45) Date of Patent: May 28, 2019

(54) CONICAL SCANNING PROCESS FOR SPACECRAFT SUN POINTING

(71) Applicant: THE CHARLES STARK DRAPER LABORATORY, INC., Cambridge, MA (US)

(72) Inventors: Joseph Shoer, Cambridge, MA (US); Leena Singh, Lexington, MA (US); Sungyung Lim, Acton, MA (US); Timothy Henderson, Ashland, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 342 days.

(21) Appl. No.: 15/360,545

(22) Filed: Nov. 23, 2016

(65) Prior Publication Data

US 2017/0144781 A1 May 25, 2017

Related U.S. Application Data

(60) Provisional application No. 62/259,329, filed on Nov. 24, 2015.

(51) Int. Cl.
*B64G 1/36* (2006.01)
*B64G 1/24* (2006.01)

(52) U.S. Cl.
CPC .............. *B64G 1/363* (2013.01); *B64G 1/36* (2013.01); *B64G 2001/245* (2013.01)

(58) Field of Classification Search
CPC ..... B64G 1/363; B64G 1/36; B64G 2001/245
See application file for complete search history.

(56) References Cited

U.S. PATENT DOCUMENTS 8,640,994 B1* 2/2014 Cosner ................ B64G 1/1021
244/158.1
2005/0230559 A1* 10/2005 Chiang .................... B64G 1/36
244/165

OTHER PUBLICATIONS

J. Shoer et al., "Conical Scanning Approach for Sun Pointing on the CYGNSS Microsatellite", IEEE Aerospace Conference, Big Sky, MT, USA (Mar. 7-14, 2015).

* cited by examiner

*Primary Examiner* — Brian M O'Hara
(74) *Attorney, Agent, or Firm* — Lando & Anastasi, LLP (57) ABSTRACT

A conical scanning method and system is provided for orienting a spacecraft with respect to a source. The system includes a spacecraft and an incidence angle sensor secured to the spacecraft to sense a signal from a source. The incidence angle sensor has a boresight that is canted with respect to the principal axis. A processor communicates with actuators on the spacecraft to adjust an attitude of the spacecraft based on information received from the incidence angle sensor and to thereby align a principal axis of the spacecraft with a direction from the spacecraft to the source. The method and system can also rely on information received from source presence sensors. The source may be the Sun, or a non-solar signal source.

16 Claims, 9 Drawing Sheets

CONICAL SCANNING PROCESS FOR SPACECRAFT SUN POINTING

CROSS REFERENCE TO RELATED APPLICATION

This application claims priority under 35 U.S.C. § 119(e) to co-pending U.S. Provisional Application Ser. No. 62/259,329 titled "Conical Scanning Algorithm for Spacecraft Sun Pointing," filed on Nov. 24, 2015, which is incorporated herein by reference in its entirety.

FEDERALLY SPONSORED RESEARCH

This invention was made with government support under Contract No. NNL13AQ00C, awarded by the National Aeronautics and Space Administration (NASA). The government has certain rights in the invention.

BACKGROUND

Most spacecraft Sun search and pointing processes use combinations of two-axis sensors with eigenaxis slew or spin maneuvers. These processes require the use of relatively complicated sensors. Some radio receiver pointing applications use a method, in which a gimbaled antenna drives in a circular pattern to determine the direction to a radio source.

SUMMARY OF INVENTION

Aspects and embodiments are directed to systems and methods for orienting a vehicle, such as a spacecraft, towards an energy source, such as the Sun. According to certain embodiments, the systems and methods can use sensors that are not as complicated as those used in conventional Sun search and pointing processes. Further, embodiments of the systems and methods disclosed herein involve maneuvers of an entire vehicle and confer the benefits of a dynamically stable maximum-inertia-axis spin on the power-seeking process.

According to one aspect of the present disclosure, a conical scanning system for orienting a spacecraft with respect to a source includes a spacecraft having a principal moment of inertia axis, the spacecraft being configured to rotate about the principal moment of inertia axis. At least one actuator is mounted on the spacecraft. An incidence angle sensor is secured to the spacecraft, and has a boresight that is canted with respect to the principal moment of inertia axis. At least one processor is in communication with the at least one actuator and in communication with the incidence angle sensor. The at least one processor is configured to control the at least one actuator to adjust an attitude of the spacecraft based on information received from the incidence angle sensor and to thereby align the principal moment of inertia axis with a line-of-sight from a point on the spacecraft to the source.

In some embodiments, at least one source presence sensor is mounted on the spacecraft. Each source presence sensor is configured to sense in a respective direction that is orthogonal to the principal moment of inertia axis.

In some embodiments, the at least one source presence sensor includes a first source presence sensor and a second source presence sensor. The first source presence sensor is configured to sense in a first direction that is orthogonal to the principal axis, and the second source presence sensor is configured to sense in a second direction that is orthogonal to the principal moment of inertia axis. The first direction is opposite to the second direction.

In some embodiments, the at least one processor is configured to provide a slew torque command to the at least one actuator based at least in part on the information received from the incidence angle sensor.

In some embodiments, the system further includes a gradient estimator configured to output a source direction based at least in part on the information received from the incidence angle sensor, and a slew torque generator configured to output the slew torque command to the at least one actuator based on the source direction.

In some embodiments, the gradient estimator includes a first-in first-out buffer, a maximum calculation element, and an angle calculation element.

In some embodiments, the source is the Sun.

In some embodiments, the at least one actuator is three mutually orthogonal actuators.

In some embodiments, each actuator is a magnetic torque rod.

According to another aspect of the present disclosure, a conical scanning method for orienting a spacecraft with respect to a source includes rotating a spacecraft about a principal moment of inertia axis of the spacecraft. The method also includes operating an incidence angle sensor secured to the spacecraft to produce an incidence angle measurement of the source with respect to the spacecraft, the incidence angle sensor having a boresight that is canted with respect to the principal moment of inertia axis. The method also includes determining a direction from the spacecraft to the source based on the incidence angle measurement. The method also includes sending a command signal to at least one actuator of the spacecraft to adjust an attitude of the spacecraft based on the incidence angle measurement and to thereby align the principal moment of inertia axis with a line-of-sight from a point on the spacecraft to the source.

In some embodiments, the method includes operating at least one source presence sensor to provide an indication of whether the source is in a field of view of the at least one source presence sensor. Each source presence sensor is configured to sense in a respective direction that is orthogonal to the principal moment of inertia axis.

In some embodiments, a first source presence sensor and a second source presence sensor are provided. The first source presence sensor senses in a first direction that is orthogonal to the principal axis, and the second source presence sensor senses in a second direction that is orthogonal to the principal axis, the first direction being opposite to the second direction.

In some embodiments, the step of determining the direction of the source further includes calculating a first estimate of the direction of the source, projected into a spacecraft xy plane based the incidence angle measurement from the incidence angle sensor, calculating a second estimate of the direction of the source, projected into the spacecraft xy plane based on the indication of whether the source is in the field of view of the first source presence sensor, calculating a third estimate of the direction of the source, projected into the spacecraft xy plane based on the indication of whether the source is in the field of view of the second source presence sensor, and averaging the first estimate of the direction of the source, the second estimate of the direction of the source, and the third estimate of the direction of the source to produce an averaged estimate of the direction of the source.

In some embodiments, the step of determining the direction of the source further includes calculating a first estimate of the direction of the source, projected into a spacecraft xy plane based the incidence angle measurement from the incidence angle sensor, calculating a second estimate of the direction of the source, projected into the spacecraft xy plane based on the indication of whether the source is in the field of view of the first source presence sensor, calculating a third estimate of the direction of the source, projected into the spacecraft xy plane based on the indication of whether the source is in the field of view of the second source presence sensor, and averaging the first estimate of the direction of the source, the second estimate of the direction of the source, and the third estimate of the direction of the source to produce an averaged estimate of the direction of the source.

In some embodiments, the source is the Sun.

According to another aspect of the present disclosure, a conical scanning system for orienting a spacecraft with respect to a source is configured to be secured to the spacecraft. In this aspect, the conical scanning system includes at least one actuator configured to be secured to the spacecraft. An incidence angle sensor is constructed and arranged to have a boresight that is canted with respect to a principal moment of inertia axis of the spacecraft when the boresight is secured to the spacecraft. The incidence angle sensor is configured to provide an incidence signal to the at least one actuator representative of a line-of-sight from a point on the spacecraft to the source. At least one processor is in communication with the at least one actuator and the incidence angle sensor. The at least one processor is configured to control the at least one actuator to provide an attitude adjustment signal based on the incidence signal received from the incidence angle sensor. The attitude adjustment signal is configured to control the spacecraft to rotate the principal moment of inertia axis towards the line-of-sight from the spacecraft to the source.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Orienting a spacecraft towards the Sun has applications both to attitude acquisition following deployment of the spacecraft from a launch vehicle and to attaining a safe state of the spacecraft following an anomaly in orbit. Aspects and embodiments disclosed herein provide systems and methods for a spacecraft to locate and orient itself towards the Sun, or another energy or signal source, with source measurements provided only by incidence-angle sensors and/or presence sensors such as photocells. Such a sensor suite may not provide enough information to determine the instantaneous direction toward the source. However, certain embodiments include a process that commands a dynamically stable spacecraft maneuver which both simplifies the control architecture and allows the spacecraft processor(s) to construct an estimate of the source direction by tracking sensor measurements in a buffer. The process then drives the spacecraft to orient its sensors toward the source. For example, the process may drive the spacecraft to orient its sensors towards the Sun for the purpose of maximizing solar power collection, such as orienting planar solar panels on the spacecraft so they are orthogonal to a direction from the spacecraft to the Sun.

The systems and methods of the present disclosure grant mission-critical capabilities to spacecraft with very limited sensor suites. As such, each of the systems and methods of the present disclosure has immediate applications to volume-constrained, mass-constrained, power-constrained, or budget-constrained satellite programs. An example of such a program is a "CubeSat" or microsatellite, which have limited capacity to support bulky or massive sensors. Another example is a constellation of small satellites, in which choosing less expensive sensors in exchange for implementing a method in accord with the methods disclosed herein may reduce overall mission cost. Yet another example is the use of the systems and methods of the present disclosure in the Cyclone Global Navigation Satellite System (CYGNSS) microsatellite constellation. Each CYGNSS microsatellite is a small satellite that both has constraints on its possible sensor mounting options and falls into a National Aeronautics and Space Administration (NASA) mission class with limited total cost.

Spacecraft Sun pointing typically involves sensors that return a measurement of the direction to the Sun (containing two axes of information, such as elevation and azimuth). In contrast, the systems and methods of the present disclosure are able to provide an estimate of the Sun direction with only incidence angle information. The arrangement of sensor hardware and the conical scanning maneuver enable this estimate, as discussed in more detail below. Furthermore, the systems and methods of the present disclosure couple the conical scan to the spacecraft dynamics in such a way as to achieve alignment of an axis of the spacecraft with the direction from the spacecraft to the Sun (Sun pointing) in a straightforward and stable manner The present disclosure includes methods for a spacecraft to locate a source and use a conical scanning method to orient the spacecraft with respect to the source. For example, the present disclosure includes methods for a spacecraft to locate the Sun and orient itself such that a body-fixed reference vector, r, parallel to the maximum principal axis of inertia, points in the direction of the Sun. These methods involve a combination of hardware selection and processes, as discussed in more detail below. In some embodiments, when the principal moment of inertia axis is used as the reference vector, it is identified as r.

According to one aspect of the present disclosure, conical scanning systems for orienting a spacecraft with respect to a source are provided. Generally, an embodiment of such a system includes a spacecraft having a principal moment of inertia axis. At least one actuator is secured to the spacecraft. The spacecraft also includes an incidence angle sensor secured to the spacecraft. The incidence angle sensor has a boresight that is canted with respect to the principal moment of inertia axis. This embodiment also includes at least one processor in communication with the at least one actuator and in communication with the incidence angle sensor. The one or more processors are configured to communicate with the one or more actuators to adjust an attitude of the spacecraft based on information received from the incidence angle sensor and to thereby align the principal moment of inertia axis of the spacecraft with a direction from the spacecraft to the source. As discussed above, in certain examples the source can be the Sun, but in other examples the source can be an energy source other than the Sun or a signal source, such as an RF signal source, for example.

Figure 1:
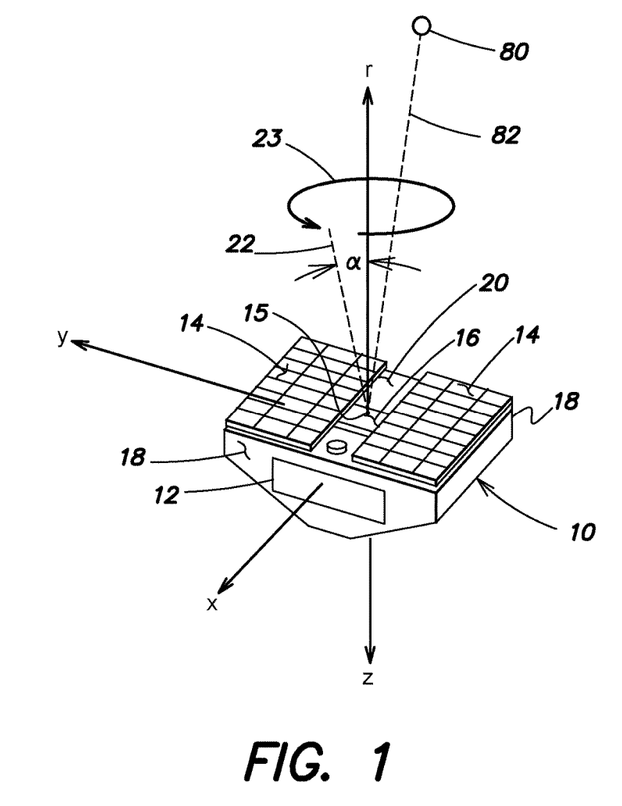
FIG. 1 is a perspective view of one example of a spacecraft.

Referring now to FIG. 1, a single CYGNSS spacecraft 10 is shown. The CYGNSS spacecraft 10 is a roughly trapezoidal prism with approximately the same volume envelope as a 4U×6U×2U CubeSat, where each U is a modular satellite unit measuring 10 centimeters by 10 centimeters by 11.35 centimeters. FIG. 1 illustrates the geometry and orientation of the vehicle body axes x, y, and z. During scientific operations, the spacecraft 10 is oriented with its z axis pointed toward the center of the Earth and the x axis in the orbit velocity direction. There are Sun-presence-sensing solar panels 12 mounted flush to the ±x faces 18, as well as deployable solar wings 14 on the −z face 20. In an exemplary embodiment, the mass of the spacecraft 10 is 25 kilograms, and the moments of inertia about the spacecraft body x, y, and z axes are approximately 0.48 kg m², 0.58 kg m², and 0.81 kg m² when the solar wings 14 are stowed. After deployment, the primary solar wings 14 extend in the ±y directions and the inertias become 0.97 kg m², 0.58 kg m², and 1.3 kg m², respectively.

The spacecraft 10 spins about its principal moment of inertia axis r. This is a dynamically stable condition in which the angular velocity vector Ω and angular momentum vector H obey the relationships $$\Omega \| H \| r.$$

Some nonparallel alignment is acceptable, provided the vehicle actuators can compensate for gyroscopic torques. In addition, the target angular velocity vector's magnitude Ω must be fast relative to the slew motions described below. For instance, a spacecraft spin rate of 1 revolution per minute (or six degrees per second) would suggest that the slew motions to move the direction of the principle inertia axis, r, should remain slower than about 0.1 revolutions per minute (or 0.6 degrees per second).

FIG. 1 shows a source 80, which may be the Sun in some embodiments, and a line-of-sight vector 82 extending between a point 15 on the spacecraft 10 and the source 80. Embodiments of the systems and methods of the present disclosure are useful for aligning the z axis of the spacecraft 10 with the spacecraft-to-source line-of-sight vector 82. Although the following discussion may refer primarily to the source 80 being the Sun, it is to be appreciated that it is not a requirement that the source 80 be the Sun, and the systems and methods disclosed herein may be applied to any signal or energy source, not limited to the Sun.

In FIG. 1, the point 15 is shown as a point on the incidence angle sensor 16. In some embodiments, the point 15 is located at a center of gravity of the spacecraft 10. In some embodiments, the point 15 is located at another position on the spacecraft 10.

The spacecraft 10 includes a suite of sensors that are configured to measure scalar quantities related to the incidence angle between the sensor boresight and the Sun vector. Examples of such sensors include coarse Sun sensors, solar panels that telemeter received power measurements, and single photodiodes or photocells that produce an electrical current. Each sensor is placed on the spacecraft body to meet certain conditions, depending on whether the sensor is configured to sense the incidence angle to the Sun or only Sun presence.

According to one embodiment, the suite of sensors available on the spacecraft includes a magnetometer, which during Sun Point operations provides a 3-axis measurement of the local magnetic field vector, a coarse Sun sensor 16 on the −z face 20, and the solar panels 12 on the −x and +x faces 18 of the spacecraft 10. The electric current each solar panel 12 generates is proportional to the cosine of the angle between the Sun and the ±x axis; the electrical power system makes electrical current data available to the attitude determination and control subsystem (ADCS), which is discussed in further detail below. The −z face coarse Sun sensor 16 is a calibrated photodiode that also produces a current proportional to the cosine of the angle between the Sun and its boresight, which is canted by an angle α, from the −z axis toward the x axis. In one example α=10°; however, other cant angles can be used. The axis 22 of the boresight of the coarse Sun sensor 16 is shown in FIG. 1. In one example the solar panels 12 have an 80° field of view, and the coarse Sun sensor 16 views a cone with a 60° half-angle centered about the axis 22 of the boresight. In some embodiments, all three sensors (the coarse Sun sensor 16 and the two solar panels 12) produce a cosine-of-angle measurement. In other embodiments, the coarse Sun sensor 16 produces a cosine-of-angle measurement, and the source presence solar panels 12 produce an indication of whether the source is present or not.

The incidence angle sensor 16 is oriented with respect to the spacecraft 10 such that its boresight is canted away from the body-fixed reference vector in a known direction. FIG. 1 shows an example in which the reference vector, r, is aligned with the spacecraft −z axis and the sensor boresight 22 is canted away from the −z direction toward the +x direction, such that a rotation of the spacecraft about the r axis sweeps the sensor boresight in a cone centered on the −z direction. The arrow 23 in FIG. 1 lies along the conical path of the boresight 22. The cant angle α is greater than the incidence angle resolution of the sensor. By rotating the spacecraft 10, or by otherwise sweeping the boresight 22 through a cone that is defined by the arrow 23 and the point 15, the incidence angle sensor boresight axis 22 is rotated, and there is no need for a gimbaled incidence angle sensor.

Figure 2:
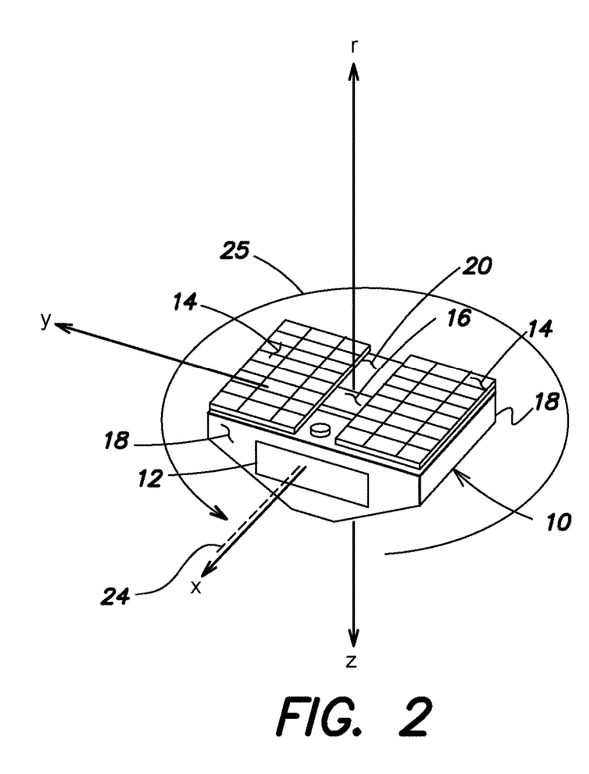
FIG. 2 is another perspective view of the spacecraft of FIG. 1.

According to one embodiment, the two Sun presence sensors 12 must be mounted with their respective boresight axes at a greater angle away from the r axis than their fields of view. As the spacecraft rotates about r, the Sun presence sensors are oriented with respect to the x axis such that at some times during the rotation the sensors register Sun presence and at other times they do not. FIG. 2 shows an example of a Sun presence sensor with a field of view <90° that is mounted with its boresight axis 24 parallel to the +x direction. The arrow 25 in FIG. 2 lies along the plane through which the Sun presence sensor boresight 24 travels as the spacecraft rotates about its principal moment of inertia axis r, which is aligned with the z axis of the spacecraft 10.

A similar second Sun presence sensor 12 is secured to the opposite −x face 18, and its boresight axis extends parallel to but 180° away from the boresight axis 24 of the first Sun presence sensor 12 on the +x face 18. The boresight axis 24 of the first Sun presence sensor and the boresight axis of the second Sun presence sensor extend in the xy plane.

The spacecraft 10 includes a processor that is operable to adjust the attitude of the spacecraft by sending commands, such as torque commands, to attitude actuators mounted on or in the spacecraft 10. In an exemplary embodiment of the spacecraft 10, the only attitude actuators of the spacecraft 10 are three mutually orthogonal magnetic torque rods, which each produce a torque that aligns their net dipole moment to the local magnetic field. In one example, the magnetic torque rods are capable of producing a 1 A $m^2$ dipole moment apiece, but are limited to a 40% duty cycle to prevent interference with the magnetometer. The torque rods are mounted along the body axes x, y, and z of the spacecraft 10.

In some embodiments, the only attitude actuators of the spacecraft 10 are three mutually orthogonal reaction wheels.

In some embodiments, additional sensors and actuators, including a star tracker, medium Sun sensor, GPS receiver, and reaction wheels, can be included in the spacecraft 10 for nominal operations. However, in the exemplary embodiment of the spacecraft 10, the Sun Point mode does not make use of these components due to engineering limitations of system safe mode architecture.

In some embodiments, the spacecraft 10 rotates about an axis other than the principal moment of inertia axis, but at the cost of increased actuator loads to stabilize the spacecraft. In some embodiments, the spacecraft 10 does not spin about an axis, but moves in another way, such as by wobbling about point 15, to effect a conical sweep of the boresight 22. In such examples, the actuators or operated to cause this sweeping.

Figure 3:
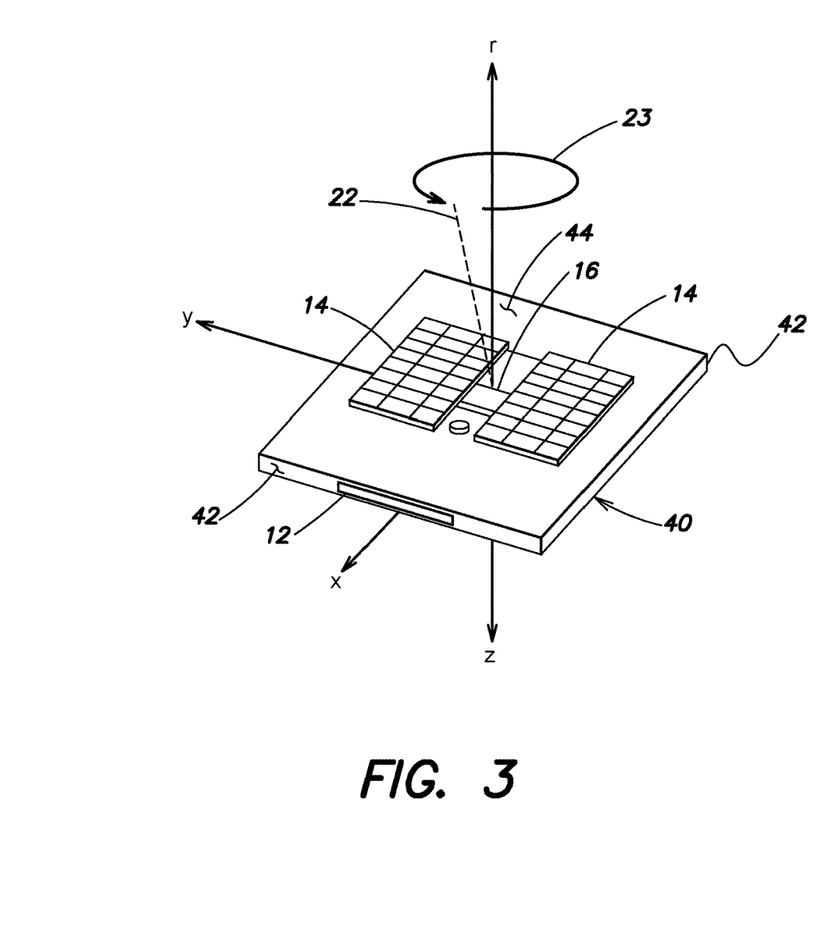
FIG. 3 is a perspective view of another example of a spacecraft.

While FIGS. 1 and 2 show a spacecraft 10 that is a CYGNSS spacecraft, the methods disclosed herein can be implemented on other types of spacecraft. FIG. 3 shows a spacecraft 40 that has different geometry than the spacecraft 10. During scientific operations, the spacecraft 40 is oriented with its z axis pointed toward the center of the Earth and the x axis in the orbit velocity direction. There are solar panels 12 mounted flush to the ±x faces 42, as well as deployable solar wings 14 on the −z face 44. The spacecraft 10 spins about its principal moment of inertia axis r. The sensor boresight 22 is canted away from the −z direction toward the +x direction, such that a rotation of the spacecraft about the r axis sweeps the sensor boresight in a cone centered on the −z direction. The arrow 23 in FIG. 3 lies along the conical path of the boresight 22. The cant angle is greater than the incidence angle resolution of the sensor.

Figure 4:
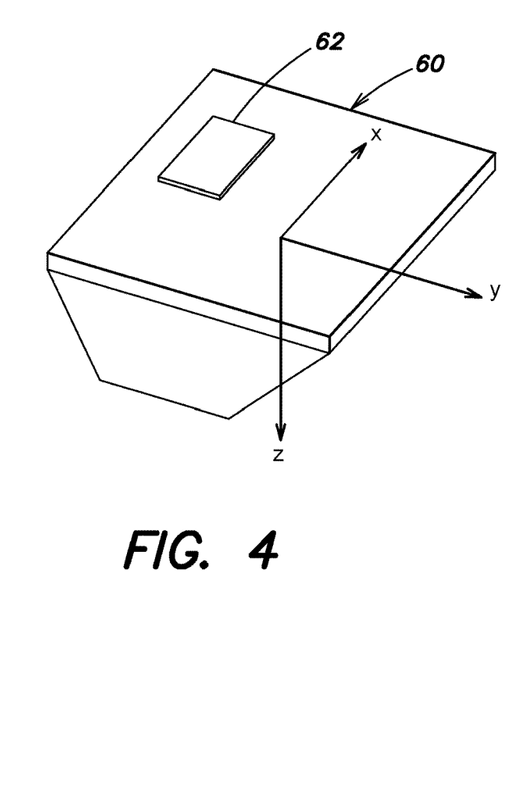
FIG. 4 is a perspective view of another example of a spacecraft.

FIG. 4 shows a spacecraft 60 with a sensor 62 configured to receive a signal from a source. The sensor 62 can be a radar sensor, an optical sensor configured to sense a laser, or another energy collector that is configured to sense a non-solar signal. Such a sensor is useful for stabilizing the spacecraft 60 with respect to another space-based object that is not the Sun. The sensor 62 can be used in place of the incidence angle sensor 16 in the systems and methods discussed herein.

As discussed above, certain aspects of the present disclosure provide source acquisition and source pointing methods, such as a Sun acquisition and pointing method. These methods may be useful for orienting a spacecraft with respect to a source. According to one embodiment, a source pointing method includes steps of rotating a spacecraft about a principal moment of inertia axis of the spacecraft, operating an incidence angle sensor secured to the spacecraft, the incidence angle sensor having a boresight that is canted with respect to the principal axis, and sending a command signal, such as a command torque signal, to an actuator of the spacecraft to adjust an attitude of the spacecraft based on information received from the incidence angle sensor and to thereby align the principal moment of inertia axis with a direction from the spacecraft to a source, such as a line-of-sight from a point on the spacecraft to the source.

In some embodiments, the source is the Sun, and the objective of the source pointing method is to point the −z face solar panel in the direction of the Sun vector.

Figure 5:
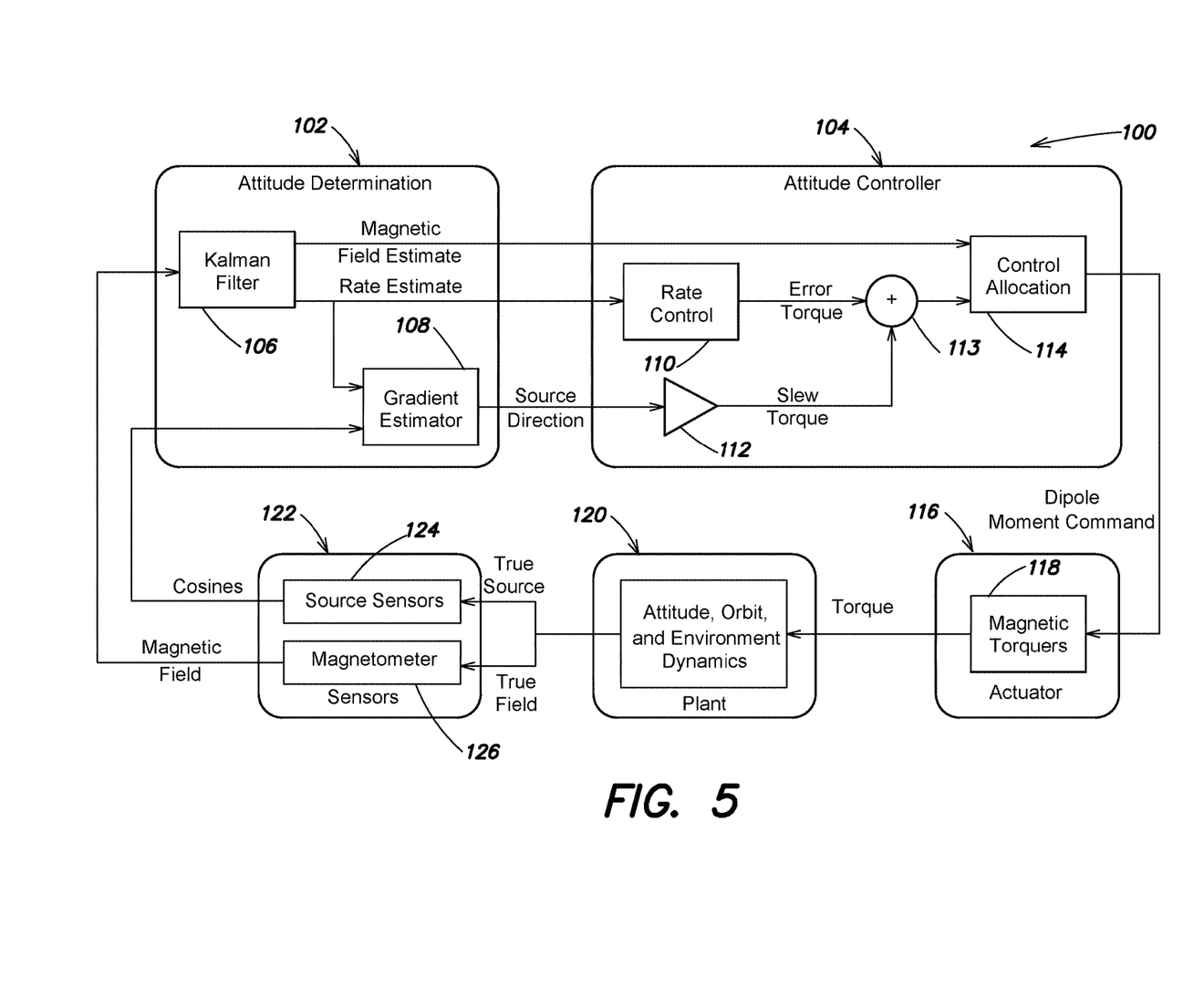
FIG. 5 is a diagram of an example of a source point attitude determination and control subsystem.

A block diagram 100 of an embodiment of the attitude determination and control subsystem (ADCS) and a dynamically controlled spacecraft is shown in FIG. 5, including an attitude determination block 102 and an attitude controller 104. The attitude controller 104 sends a signal to at least one actuator 116 to affect the attitude of the spacecraft at block 120.

The attitude determination 102 portion includes two parts: a Kalman filter 106 that processes magnetometer measurements of the local magnetic field into a magnetic field estimate and body rate estimate, and a gradient estimator 108 that uses knowledge about the rate profile of the spacecraft 10, 40, 60 to build up an estimate of the direction from the spacecraft 10, 40, 60 to the Sun.

Although a Kalman filter 106 is shown, the system may include in its place another filter that can process magnetometer measurements and produce an estimate of the spacecraft body rate. Thus, in some embodiments, an estimation filter other than a Kalman filter is used in place of Kalman filter 106.

The attitude controller 104 includes three components: a proportional control loop 110 around the angular rate of the spacecraft 10, 40, 60, a slew torque generator 112 to drive the spacecraft −z axis in the direction of the Sun vector, and a control allocation block 114 to relate desired attitude control torque into a dipole command.

A dipole command from the attitude controller 104 is input into the at least one actuator 116 that causes three magnetic torquers 118 of the spacecraft to adjust the attitude of the spacecraft 10, 40, 60. The torque output of the three magnetic torquers 118 affects the attitude of the spacecraft at block 120. The three magnetic torquers may be three orthogonal torquers, each parallel to one of three respective orthogonal axes, such as axes x, y, and z of the respective spacecraft 10, 40, 60.

The sensors at block 122 include source sensors 124 and a magnetometer 126 to sense the orientation of the spacecraft. The source sensors 124 may be Sun sensors 12, 16 in some embodiments. The output of the sensors at block 122 is fed to the attitude determination block 102.

In certain applications, immediately preceding initiation of the Sun pointing method, the spacecraft detumbles from any launch separation rate or anomalous rate. The spacecraft is spinning, and in one example, after the angular velocity falls below a threshold, the ADCS switches to Sun pointing mode.

Figure 6:
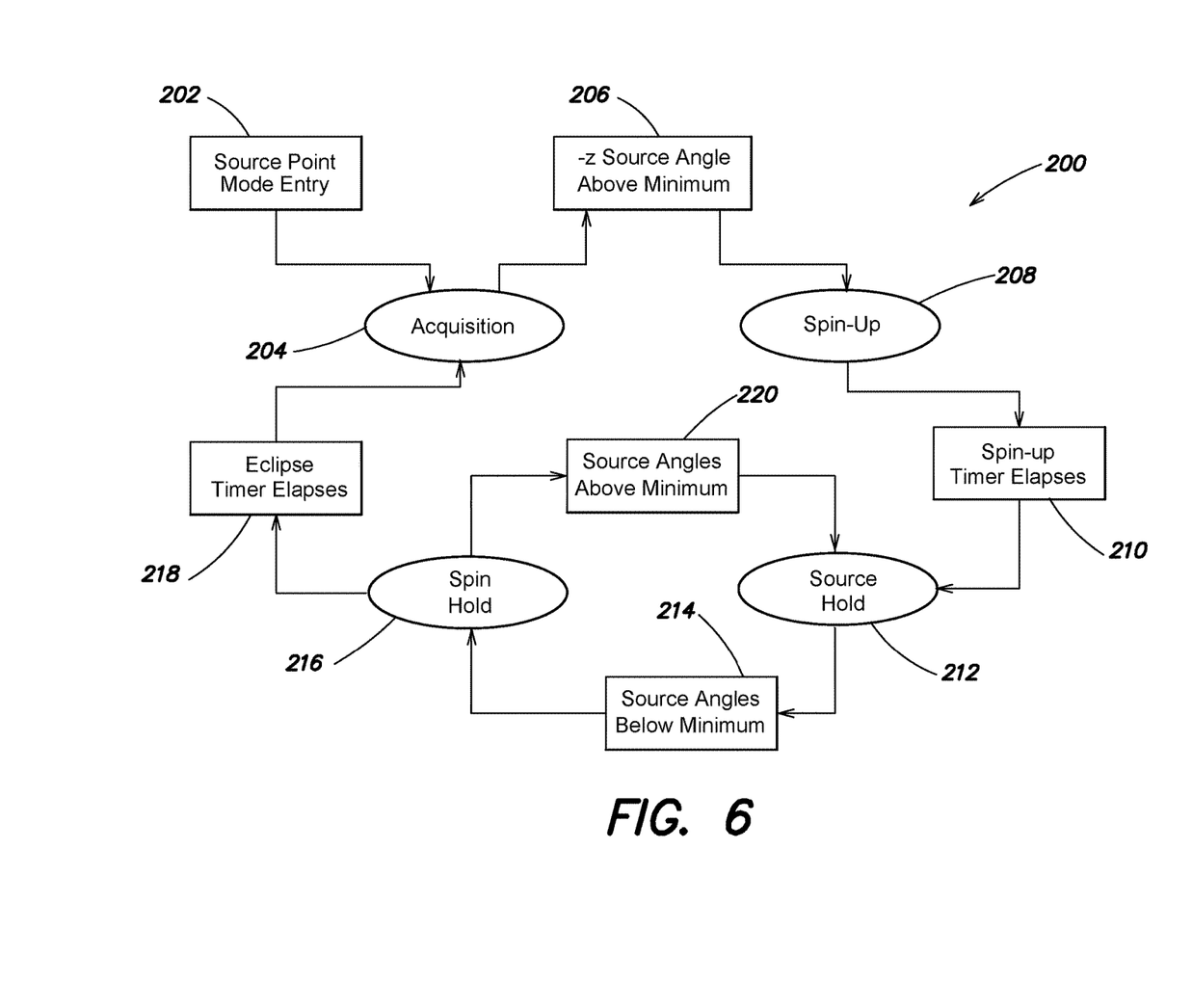
FIG. 6 is a block diagram of the submodes of one example of a method of source pointing.

An exemplary embodiment of the Sun acquisition and pointing method 200 proceeds in four phases (generally called "submodes" herein) with transitions governed by timers and thresholds on measurements. This method is simple and robust, requiring as little sensor feedback or estimation as possible, while maintaining necessary capabilities such as distinguishing between Earth shadow entry and loss of Sun pointing. In the illustrated example, the submodes are source acquisition 204, spin up 208, source hold 212, and spin hold 216. FIG. 6 illustrates the mode transition diagram for the transitions between submodes. The current ADCS submode determines two particular details of the method operation: the rate target for the rate control loop and whether or not the gradient estimator is active.

The following description relates to an embodiment in which the source is the Sun.

When the source is the Sun, the submodes of FIG. 6 may be referred to as Sun acquisition 204, spin up 208, Sun hold 212, and spin hold 216.

At block 202, the overall Sun Point mode 200 is entered, and the method proceeds to Sun acquisition submode 204. The purpose of Sun acquisition submode 204 is to rotate the spacecraft 10, 40, 60 from its arbitrary initial attitude so that the Sun is within the field-of-view of the coarse Sun sensor 16. At block 204, the Sun acquisition submode 204 achieves this result by performing a slow roll of the spacecraft about its x axis, a maneuver which, with the CYGNSS sensor geometry, is effectively a full-sky search for the Sun. In one example, the roll rate of the spacecraft 10, 40, 60 brings the Sun into the field of view of the −z sensor 16 within one quarter of an orbit. Sweeping the −z sensor 16 around the x axis may leave blind spots in the ±x directions, however, and therefore the control logic can use the sensors on the ±x faces to cover these directions. Should the Sun appear on the ±x sensors 12, the controller commands a slow ∓y spin. In Sun Acquisition submode 204, the gradient estimator is not operational.

When the Sun is at an angle above a minimum angle with respect to the xy plane, such that it is within the field of view of the −z coarse Sun sensor 16 at block 206, the attitude control system transitions into spin up submode at block 208. As the name implies, the purpose of the spin up submode 208 is to establish an equilibrium spin about the spacecraft's principal inertia axis. In one example, the rate target is 1.5 degrees per second (called the "coning rate" because of its effect on the sensor boresight 22) about the −z body axis, with control error determined from the rate estimate; the target remains the same for all subsequent Sun pointing submodes. The gradient estimator and slew control are inactive. After a prescribed timer elapses at block 210, the ADCS transitions into block 212, a Sun hold submode. The prescribed timer for the Spin Up submode 208 may be 3,600 seconds in some embodiments.

The Sun hold submode 212 operates to converge the spacecraft-to-Sun vector towards the spacecraft −z axis. In one example, the Sun hold submode 212 uses a gradient search that buffers received power measurements from the Sun sensors as the Sun sensor 16 sweeps out a cone about the −z axis, and the solar presence sensors 12 sweep through the xy plane. The source pointing method estimates the direction to the Sun from information contained in the buffers, given assumptions and knowledge about the spacecraft rate, and computes the torque that will slew the main solar panels 14 so they are orthogonal to that direction. In effect, the spacecraft carries out a gradient search to "home-in" on the direction of maximum received power on the solar array. The buffers of the Sun hold submode 212 are discussed in further detail with respect to FIGS. 9A-9C.

If the current generated by all the solar panels falls below a threshold value while in Sun hold submode 212, then at block 214 the ADCS assumes that the spacecraft has orbited into Earth's shadow, and it then transitions into spin hold submode, block 216, which controls the spacecraft angular velocity to the nominal spin. A timer also increments in spin hold submode 216; if the elapsed time is greater than the expected length of eclipse, for example greater than 2,400 seconds, then at block 218 the attitude control system treats the situation as a loss of Sun pointing and restarts Sun acquisition submode 204. However, if sunlight is received by the sensors at any moment before the timers elapse, the Sun angle is identified as being above a minimum at block 220, and the ADCS returns to Sun hold submode 212 and performs the gradient search. The spacecraft (or other vehicle) will then re-converge from any small loss of Sun pointing that may have occurred during the eclipse.

Apart from the timers and the specific submode transition logic, the attitude determination and control in Spin Hold submode 216 is identical to that in Spin Up submode 208.

Parameters of the systems may be set based on the sensors used, the signal being sensed for attitude control of the vehicle, and the performance requirements of the application. In an exemplary embodiment, the coarse Sun sensor cant angle $\alpha$ is 10°, where the resolution of the sensor is 5°, so that the cant angle is twice the resolution of the sensor. In addition, the coning rate about the −z axis, $\Omega$, is set to 1.5 degrees per second, which strikes a balance in the exemplary embodiment between the need to spin the spacecraft rapidly to provide enough frequency separation between fast and slow control loops and the need to spin the spacecraft up to this rate from zero, which takes a finite time. In other applications, other values may be selected.

The cant angle depends on the sensitivity of the incidence angle sensor 16 and the peak power of the signal from the source. For example, when the source is the Sun, a cant angle of 1° would likely be too small, but for radar applications, the cant angle could be smaller than 1°.

Additionally, threshold values for source presence sensors can be set. A critical set of parameters are the thresholds for registering Sun presence on the coarse Sun sensor and ±x solar panels in acquisition submode 204 and the spin hold submode 216. Each of those sensors passes an electrical current measurement equivalent to cosine of incidence angle to the attitude determination block 102. In the case of the coarse Sun sensor in which the field of view is 60° and the sensor is mounted with a 10° cant angle, only measurements greater than cos (50°) will stay within the field of view as the spacecraft spins about −z. Therefore, for this example, the selected presence threshold is cos (45°). For the solar panels 12, there may be nonzero measurements extending out to as wide an angle as 85°; however, the Sun presence threshold can be cos (70°) to provide some cushion against spurious loss or appearance of Sun presence at high angles due to noise. When the spacecraft is in Sun hold submode 212 only, it moves to a wider set of thresholds in order to provide some protection against rapid toggling between Sun hold 212 and spin hold 216. In one example, these wider thresholds are cos (60°) for the coarse Sun sensor 16 and cos (80°) for the Sun presence sensor solar panels 12.

Figure 7:
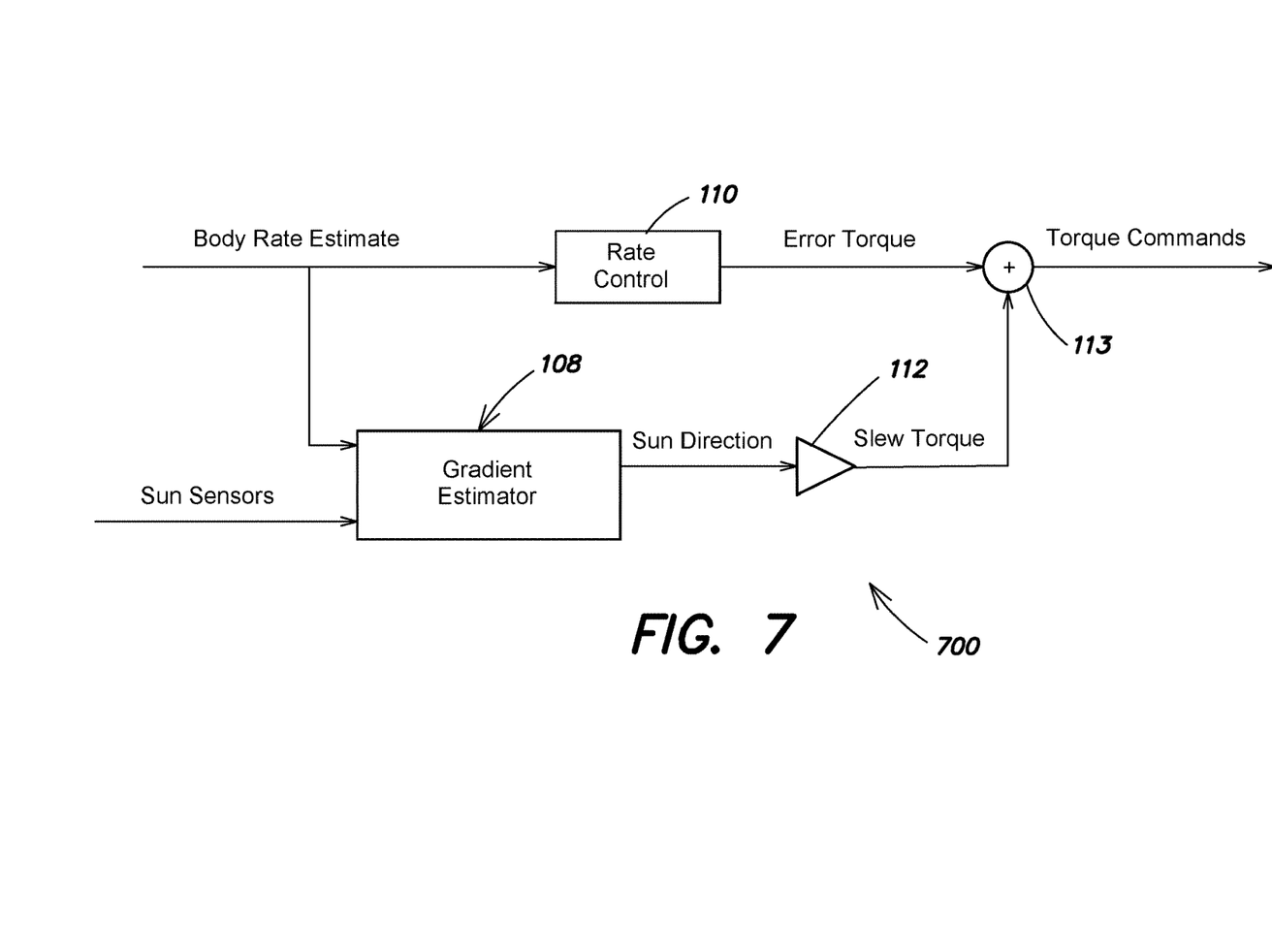
FIG. 7 is a block diagram of one example of control architecture.

In another aspect, the present disclosure provides methods for providing a torque command based on data collected from the Sun sensors. FIG. 7 shows a block diagram of an embodiment 700 of the control architecture for implementing the methods for providing a torque command. This example of the control architecture fits into the larger scheme of an attitude determination and control system for implementing the source pointing methods. The proportional control loop 110, the slew torque generator 112, and the gradient estimator 108 of FIG. 5 may be used in place of the generalized components of FIG. 7. The components of the block diagram of FIG. 7 may also be used in other embodiments of a system according to the present disclosure.

The rate control block 110 produces a maneuver that scans the sensor around in a cone-shaped trajectory by driving the spacecraft angular velocity to be parallel to r. It computes body torque commands with, for example, a proportional control law. The source of the input to this rate control block 110 is, for example, a gyro measurement or a Kalman filter estimate.

In some embodiments, the spacecraft 10 does not spin to effect the conical sweeping of the boresight 22. In some embodiments, the rate control block 110 maintains zero spin of the spacecraft, but causes the actuators to effect a motion of the spacecraft that sweeps an incidence angle boresight through a cone, for example the cone passing through arrow 23 and point 15. For example, the actuators can cause a wobbling motion about point 15 to effect this conical sweeping.

A gradient estimator 108 combines knowledge about the conical scanning maneuver (from the body rate estimate) with the incidence angle measurements from the coarse Sun sensor 16 to produce an estimate of the direction from the spacecraft to the Sun. The output of the gradient estimator 108 is input into a slew torque generator 112.

The output of the rate control block 110 and the output of the slew torque generator 112 are summed at summation block 113 to provide a torque command to orthogonal actuators of the spacecraft to adjust the attitude of the spacecraft.

Figure 8:
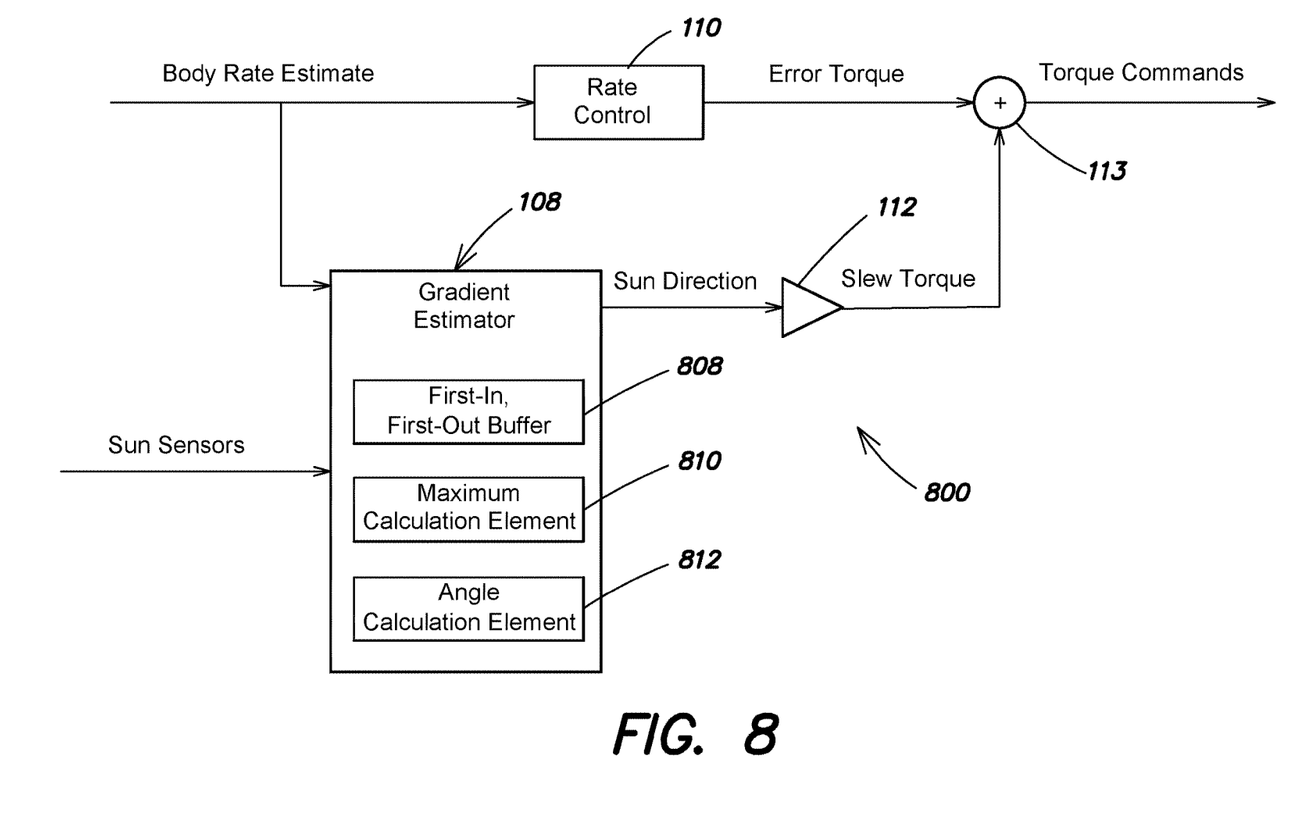
FIG. 8 is a block diagram of another example of the control architecture.

FIG. 8 shows a block diagram of another example 800 of the control architecture for implementing the methods for providing a torque command This control architecture fits into the larger scheme of an attitude determination and control suite containing estimation processes, control allocation processes, and mode management processes of any desired type. This block diagram is a more detailed embodiment of the block diagram of FIG. 7.

In FIG. 8, the gradient estimator 108 includes a first-in, first-out buffer 808, a maximum calculation element 810, and an angle calculation element 812.

The first-in, first-out buffer 808 is, for example, a push-down stack of the data from each Sun sensor. Each first-in, first-out buffer 808 contains $2\pi/\theta$ (or $360°/\theta$, when $\theta$ is in degrees) elements. In one example, a new measurement is entered into the first-in, first-out buffer 808 whenever the spacecraft has rotated by an integer multiple of angle $\theta$ about r, according to the input rate estimate and the internal spacecraft clock.

The maximum calculation element 810 computes which buffer index i contains the maximum data element, in the case of an incidence angle sensor, or which index i contains the middle of the largest sequence of "present" measurements in the case of a presence sensor.

In some embodiments, the attitude determination portion of the method disclosed herein includes a Sun direction estimation through the gradient estimator 108. In certain examples, this Sun gradient estimator 108 is only active in the Sun hold submode 212. In order to slew the −z axis of the spacecraft 10, 40, 60 towards the Sun, the attitude control system needs an estimate of a projection of the spacecraft-to-Sun unit vector in the spacecraft xy plane. This estimate comes from a conical scanning process, which keeps buffers of the three Sun sensor measurements as the incidence angle sensor 16 sweeps through a cone centered on the −z body axis. The data buffers are of fixed size such that each buffer entry corresponds to a specified angle of arc, with the entire buffer covering 360° of spacecraft rotation. Once the data buffers are full, the process can estimate the direction to the Sun from the fact that the maximum data value of each buffer is the sensor measurement taken when the sensor boresight was most closely aligned to the Sun vector. This principle is the basis for flight-proven conical scanning gradient search methods in radio frequency antenna pointing applications. The data buffers are described in further detail below in relation to FIGS. 9A-9C.

In antenna-pointing applications, the conical sensor sweep is typically the result of a two-axis gimbal dithering about its average pointing axis. A body dither motion is possible on a spacecraft if the actuators apply sinusoidal, out-of-phase torques on the axes perpendicular to the sensor boresight (for CYGNSS, x and y). However, that motion profile has high torque requirements which may not align with possible m×B torque directions. Accordingly, a CYGNSS satellite instead realizes a conical sweep by having canted sensors and by spinning about its maximum principal inertia axis. For the solar panels, therefore, in this example, the half-angle of the swept cone is 90°, while the coarse Sun sensor sweeps a cone with half-angle equal to the sensor cant angle from the spin (−z) axis, $\alpha=10°$.

In one example, the z component of the angular velocity estimate determines the update interval for the buffer. The conical scan process waits until the estimated z rate times the spacecraft clock exceeds the angle corresponding to the next buffer entry before recording a data point. The conical scan process assumes that the spacecraft has a well-established spin at rate $\Omega$ about the z axis, such that the buffer entries represent the sensor measurements taken at a corresponding angle in the xy plane. The angle zero corresponds to the buffer entry covering an arc that begins at the spacecraft +x axis. Thus, the spacecraft has rotated an additional angle $\theta$ about the −z axis since taking the measurement stored in the buffer entry with index i=floor($\theta$)/$\Delta\theta$=floor($\Omega t_{clock}$)/$\Delta\theta$. For example, with $\Delta\theta=5°$, the buffer entries at index 6 correspond to measurements taken when the x axis is pointed in a direction 30° before its direction at the time the buffer received this entry. Fresh data continues to enter the buffers at i=1($\theta=0°$), replacing old data in first-in, first-out fashion.

From the conical scan principle and the relationship between buffer index and rotation angle, it follows that the index of the maximum value in a buffer estimates the projection of the spacecraft-to-Sun unit vector ŝ onto the xy plane, $\hat{s}_{xy}$. The incidence angle maximum is a peak of the data in FIG. 9A. The maximum for each source presence sensor is located at the midpoint of a set of "present" elements 907,911. The −x solar presence sensor array buffer maximum actually corresponds to an angle that can be roughly 180° off from the maximum of the +x solar presence sensor array buffer maximum, as reflected by FIGS. 9B and 9C. For slightly over one-half of each revolution, the measurement from the Sun presence solar panels 12 is zero, while the measurement from the coarse Sun sensor 16 is available as long as the Sun remains within its field of view. Thus, the coarse Sun sensor buffer's estimate always receives updates, whereas for approximately half the spin period, the ±x solar panel buffer estimates contains stale data. The un-updated buffers continue to fill with zeros as the spacecraft clock advances, however, and in this manner the Sun estimates propagate until the Sun comes into view of the solar panel again. Furthermore, due to subtleties of the electrical power system, in practice the telemetry from the ±x solar panels may only be the binary states of presence or non-presence. In this case, the corresponding buffers appear as square waves and the gradient estimator may simply pick the middle index of the Sun-presence region. Finally, the gradient estimator averages all available estimates of $\hat{s}_{xy}$ around the unit circle before passing a direction estimate on to the control system.

Figure 9A:
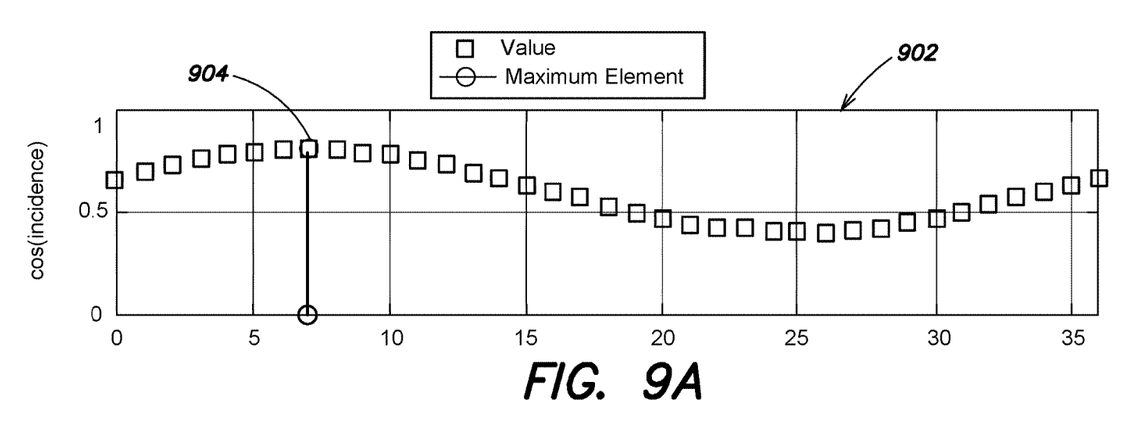
FIG. 9A is a plot of sample data collected from an incidence angle sensor.
Figure 9B:
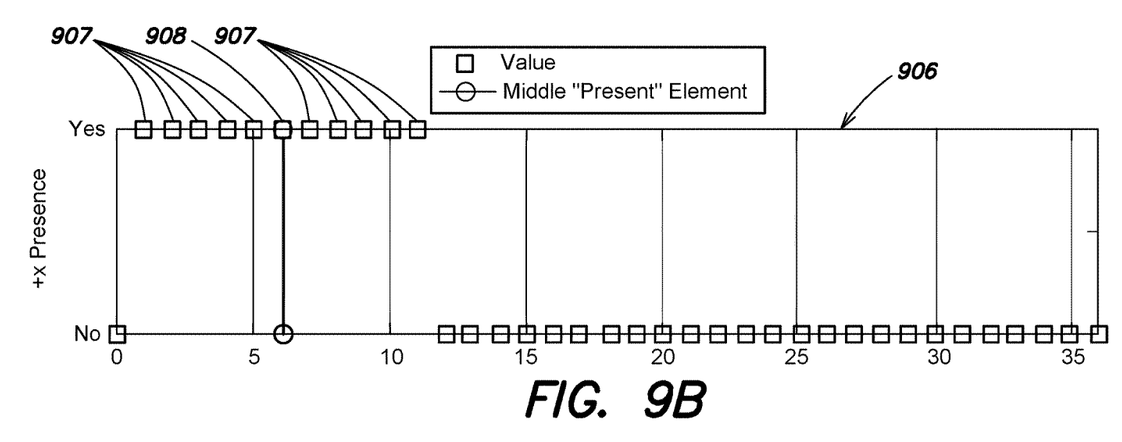
FIG. 9B is a plot of sample data collected from a first presence sensor.
Figure 9C:
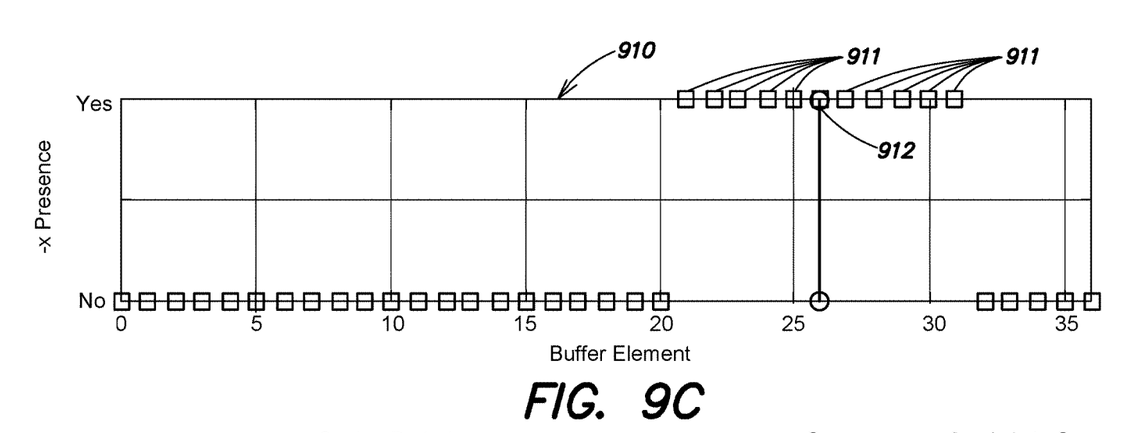
FIG. 9C is a plot of sample data collected from a second presence sensor.

FIGS. 9A-9C illustrate the appearance of the data buffers for three sensors. One of the sensors is an incidence angle sensor 16 as shown in FIG. 1. Two of the sensors are presence sensors 12 pointing along the boresight axis 24, which is parallel to the −x and +x axes in FIG. 2.

The angle calculation element 812 converts the buffer index i to an angle about the r vector, by multiplying i and θ and accounting for the direction of the sensor in the spacecraft xy plane.

FIGS. 9A-9C show sample data collected from an incidence angle sensor and two presence sensors. In FIGS. 9A-9C, each buffer contains 37 elements, which corresponds to θ=10°. For FIG. 9A, the incidence angle sensor is canted toward the +x axis and its maximum element 904 is the seventh element in the buffer 902 (with the first element being numbered zero), so the corresponding angle is 70°. For FIG. 9B, the presence sensor is pointing along the +x axis in FIG. 2. There are multiple "present" elements 907 indicating a detected presence of the Sun, with the middle "present" measurement being the sixth element 908 in the buffer 906, so the corresponding angle is 60°. FIG. 9C depicts the buffer associated with a presence sensor aligned to −x in FIG. 2. There are multiple "present" elements 911 indicating presence of the Sun, with the middle "present" element being the twenty-sixth element 912, so the corresponding angle is 80° after accounting for the 180° offset of the second Sun presence sensor from the first Sun presence sensor.

An average of the maximum element 904 of FIG. 9A, the middle element 908 of FIG. 9B, and the middle element 912 of FIG. 9C is an estimate to the direction of the Sun, projected into the spacecraft xy plane. The unit vector in the xy plane is the output of the gradient estimator.

Referring again to FIG. 8, a summation block 113 applies a combination of the control torque from the rate control block with a torque in direction output from the gradient estimator 108. Since the spacecraft spins about a principal axis of inertia, a torque in this direction precesses r towards the Sun vector. If an incidence angle sensor is available, the magnitude of this applied torque should be proportional to the difference between the maximum and minimum values in the incidence sensor buffer. The combination of this command torque with the principal axis spin, when linearized, reduces to the closed-loop dynamics of proportional control of the angle between r and the Sun.

Thus, the process effects a gradient search in which the spacecraft seeks to maximize the sensor measurement over the entire data buffer, which occurs when the r vector is pointed towards the Sun.

Figure 10:
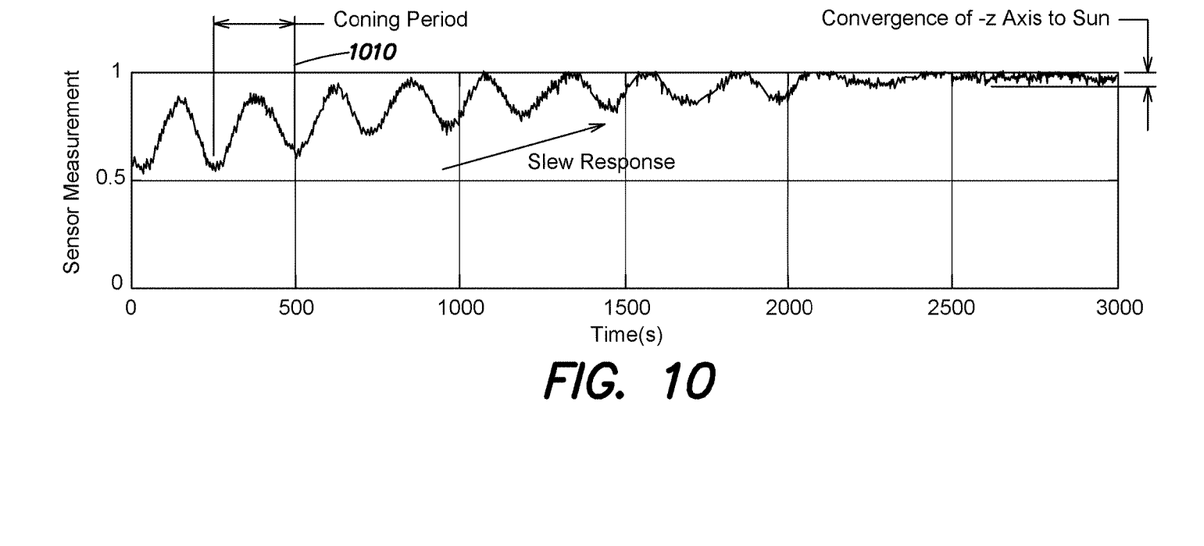
FIG. 10 is a plot of incidence angle measurement over time during operation of a conical scanning process.

FIG. 10 shows that the incidence angle measurement increases as the conical scanning process orients the spacecraft towards the Sun. FIG. 10 shows the coning period 1010. The −z axis and the direction to the Sun are not aligned, and the canted incidence angle sensor provides a periodic signal. Over time, the methods of the present disclosure cause the −z axis to align with the direction to the Sun. FIG. 10 shows that between 2,500 seconds and 3,000 seconds, the amplitude of the oscillation in the incidence angle measurement is reduced as the spacecraft has been rotated such that a line-of-sight from a point on the incidence angle sensor 16 to the Sun is more closely aligned with the moment of inertia axis, r, about which the spacecraft 10 rotates. In some embodiments of the systems and methods, the convergence of the −z axis to the direction to the Sun may not be a perfectly parallel alignment, but may exhibit an approximate alignment.

Figure 11:
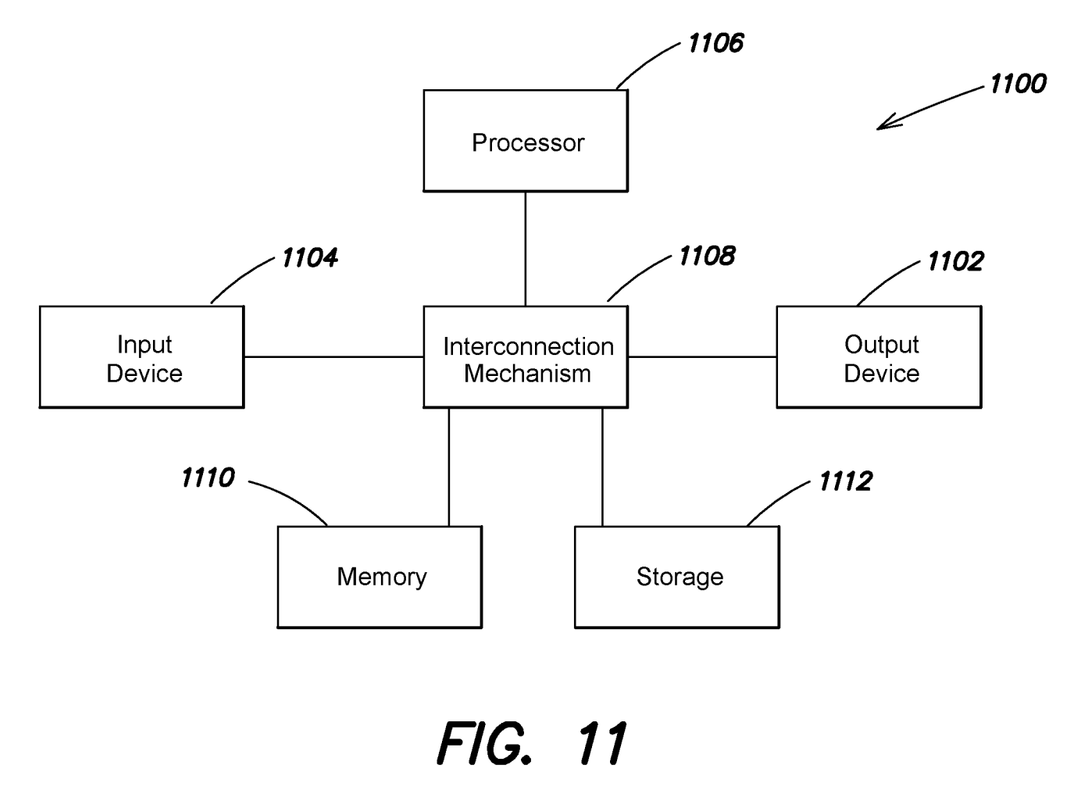
FIG. 11 is a block diagram of an electronic system in which various embodiments of the methods disclosed herein may be implemented.

FIG. 11 shows a computing system 1100 in which certain methods of the present disclosure can be implemented. The components of FIG. 11 can be mounted on the spacecraft. The processor 1106 can implement the steps of methods described above. The input device 1104 includes the incidence angle sensor 16 and the source presence sensors 18. The output device 1102 includes the attitude controller 104.

The system 1100 may include for example a computing platform such as those based on Intel PENTIUM-type processor, Motorola PowerPC, Sun UltraSPARC, Texas Instruments-DSP, Hewlett-Packard PA-RISC processors, or any other type of processor. According to at least one embodiment the system 1100 includes a computing platform based on a processor that is qualified for use and operations in space, for example, a SP0 3U CompactPCI Radiation Tolerant PowerPC SBC manufactured by Aitech Defense Systems, Inc. of Chatsworth, Calif. System 1100 may include specially-programmed, special-purpose hardware, for example, an application-specific integrated circuit (ASIC). As discussed above, various aspects of the present disclosure may be implemented as specialized software executing on the system 1100 such as that shown in FIG. 11.

The system 1100 may include a processor/ASIC 1106 connected to one or more memory devices 1110, such as a disk drive, memory, flash memory or other device for storing data. Memory 1110 may be used for storing programs and data during operation of the system 1100. Components of the computer system 1100 may be coupled by an interconnection mechanism 1108, which may include one or more buses, for example between components that are integrated within a same machine, and/or a network, for example between components that reside on separate machines. The interconnection mechanism 1108 enables communications, for example data and/or instructions, to be exchanged between components of the system 1100. The interconnection mechanism 1108 can operate as an Analog to Digital Converter or a Digital to Analog Converter, between components of the system 1100. In addition to the incidence angle sensor 16 and the source presence sensors 18, the system 1100 can include other input devices 1104 for receiving an input. In addition to the attitude controller 104, the system 1100 can include other output devices 1102, which may include for example a visual display, a heads up display, a near-eye display, an augmented reality display, an auditory output device, a tactile output device, etc. In addition, the computer system 1100 may contain one or more interfaces (not shown) that may connect the computer system 1100 to a communication network, in addition or as an alternative to the interconnection mechanism 1108.

The system 1100 may include a storage system 1112, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1110 that allows for faster access to the information by the processor/ASIC than does the medium. This memory 1110 may be a volatile, random access memory such as a dynamic random access memory (DRAM) or static memory (SRAM). It may be located in storage system 1112 or in memory system 1110. The processor 1106 may manipulate the data within the integrated circuit memory 1110 and then copy the data to the storage 1112 after processing is completed. A variety of mechanisms are known for managing data movement between storage 1112 and the integrated circuit memory element 1110, and the disclosure is not limited thereto. The disclosure is not limited to a particular memory system 1110 or a storage system 1112.

The system 1100 may include a computer platform that is programmable using a high-level computer programming language. The system 1100 may be also implemented using specially programmed, special purpose hardware, for example an ASIC. The system 1100 may include a processor 1106, which may be a commercially available processor such as the well-known Pentium class processor available from the Intel Corporation. Many other processors are available. The processor 1106 may execute an operating system which may be, for example, a Real Time Operating System (RTOS). In other embodiments, the operating system may be a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

While the present disclosure includes references to the Sun, the conical scanning systems and methods discussed herein are useful for pointing an object towards a source or stabilizing an object with respect to a signal from a source, wherein the source is a non-solar source. For example, the source can be a laser source, a radio signal source, or another signal source.

While the present disclosure includes references to spacecraft, the conical scanning systems and methods discussed herein are useful for a variety of vehicles that include rotatable components. In the case of spacecraft, the systems and methods of the present disclosure are particular useful for compact spacecraft, in which case the body of the spacecraft rotates. In some vehicle embodiments, only a portion of the vehicle rotates to effect the conical scanning The cant angle of the incidence angle sensor is selected based on the sensitivity of the incidence angle sensor. The cant angle is at least as great as the detection angle of the incidence angle sensor.

The present disclosure provides systems and methods that drive the rotation of an entire spacecraft about the maximum moment of inertia axis of the spacecraft to, providing a dynamically stable spin to effect the rotation of an incidence angle sensor. The present disclosure provides systems and methods for source pointing of a spacecraft, or another vehicle, by relying only on an incidence angle sensor and two source presence sensors to determine the direction from the spacecraft to the source.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A conical scanning system for orienting a spacecraft with respect to a source, the system comprising:
    a spacecraft having a principal moment of inertia axis, the spacecraft being configured to rotate about the principal moment of inertia axis;
    at least one actuator mounted on the spacecraft;
    an incidence angle sensor secured to the spacecraft, the incidence angle sensor having a boresight that is canted with respect to the principal moment of inertia axis; and
    at least one processor in communication with the at least one actuator and in communication with the incidence angle sensor, the at least one processor being configured to control the at least one actuator to adjust an attitude of the spacecraft based on information received from the incidence angle sensor and to thereby align the principal moment of inertia axis with a line-of-sight from a point on the spacecraft to the source.

2. The conical scanning system of claim 1, further comprising at least one source presence sensor mounted on the spacecraft, each source presence sensor of the at least one source presence sensor being configured to sense in a respective direction that is orthogonal to the principal moment of inertia axis.

3. The conical scanning system of claim 2, wherein the at least one source presence sensor includes a first source presence sensor and a second source presence sensor, the first source presence sensor being configured to sense in a first direction that is orthogonal to the principal moment of inertia axis, and the second source presence sensor being configured to sense in a second direction that is orthogonal to the principal moment of inertia axis, and the first direction being opposite to the second direction.

4. The conical scanning system of claim 1, wherein the at least one processor is configured to provide a slew torque command to the at least one actuator based at least in part on the information received from the incidence angle sensor.

5. The conical scanning system of claim 4, further comprising
    a gradient estimator configured to output a source direction based at least in part on the information received from the incidence angle sensor; and
    a slew torque generator configured to output the slew torque command to the at least one actuator based on the source direction.

6. The conical scanning system of claim 5, wherein the gradient estimator comprises a first-in first-out buffer, a maximum calculation element, and an angle calculation element.

7. The conical scanning system of claim 1, wherein the source is the Sun.

8. The conical scanning system of claim 1, wherein the at least one actuator is three mutually orthogonal actuators.

9. The conical scanning system of claim 8, wherein each actuator of the at least one actuator is a magnetic torque rod.

10. A conical scanning method for orienting a spacecraft with respect to a source, the method comprising the steps of:
rotating a spacecraft about a principal moment of inertia axis of the spacecraft;
operating an incidence angle sensor secured to the spacecraft to produce an incidence angle measurement of the source with respect to the spacecraft, the incidence angle sensor having a boresight that is canted with respect to the principal moment of inertia axis;
determining a direction from the spacecraft to the source based on the incidence angle measurement;
sending a command signal to at least one actuator of the spacecraft to adjust an attitude of the spacecraft based on the incidence angle measurement and to thereby align the principal moment of inertia axis with a line-of-sight from a point on the spacecraft to the source.

11. The conical scanning method of claim 10, further comprising operating at least one source presence sensor to provide an indication of whether the source is in a field of view of the at least one source presence sensor, each source presence sensor of the at least one source presence sensor being configured to sense in a respective direction that is orthogonal to the principal moment of inertia axis.

12. The conical scanning method of claim 11, wherein the at least one source presence sensor is a first source presence sensor and a second source presence sensor, wherein the first source presence sensor senses in a first direction that is orthogonal to the principal moment of inertia axis, and the second source presence sensor senses in a second direction that is orthogonal to the principal moment of inertia axis, the first direction being opposite to the second direction.

13. The conical scanning method of claim 12, wherein the step of determining the direction to the source further comprises
calculating a first estimate of the direction to the source, projected into a spacecraft xy plane based on the incidence angle measurement from the incidence angle sensor;
calculating a second estimate of the direction to the source, projected into the spacecraft xy plane based on the indication of whether the source is in the field of view of the first source presence sensor;
calculating a third estimate of the direction to the source, projected into the spacecraft xy plane based on the indication of whether the source is in the field of view of the second source presence sensor; and
averaging the first estimate of the direction to the source, the second estimate of the direction to the source, and the third estimate of the direction to the source to produce an averaged estimate of the direction to the source.

14. The conical scanning method of claim 12, wherein the step of determining the direction to the source consists essentially of
calculating a first estimate of the direction to the source, projected into a spacecraft xy plane based on the incidence angle measurement from the incidence angle sensor;
calculating a second estimate of the direction to the source, projected into the spacecraft xy plane based on the indication of whether the source is in the field of view of the first source presence sensor;
calculating a third estimate of the direction to the source, projected into the spacecraft xy plane based on the indication of whether the source is in the field of view of the second source presence sensor; and
averaging the first estimate of the direction to the source, the second estimate of the direction to the source, and the third estimate of the direction to the source to produce an averaged estimate of the direction to the source.

15. The conical scanning method of claim 10, wherein the source is the Sun.

16. A conical scanning system for orienting a spacecraft with respect to a source, the conical scanning system being mounted on the spacecraft and comprising:
at least one actuator;
an incidence angle sensor constructed and arranged to have a boresight that is canted with respect to a principal moment of inertia axis of the spacecraft when the incidence angle sensor is secured to the spacecraft, the incidence angle sensor being configured to provide an incidence signal to the at least one actuator representative of a direction of a line-of-sight from a point on the spacecraft to the source; and
at least one processor in communication with the at least one actuator and the incidence angle sensor, the at least one processor being configured to control the at least one actuator to provide an attitude adjustment signal based on the incidence signal received from the incidence angle sensor, the attitude adjustment signal being configured to control the spacecraft to rotate the principal moment of inertia axis towards the line-of-sight from the point on the spacecraft to the source.

* * * * *